(12) United States Patent
Sauvageau et al.

(10) Patent No.: US 7,187,854 B2
(45) Date of Patent: Mar. 6, 2007

(54) HEATING TILES

(75) Inventors: Yvan Sauvageau, 69 Desiaurlers, Beloeil, Quebec (CA) J3G 3E2; Renaud Caya, Beloeil (CA)

(73) Assignee: Yvan Sauvageau, Beloeil (CA)

( * ) Notice: Subject to any disclaimer, the term of this patent is extended or adjusted under 35 U.S.C. 154(b) by 0 days.

(21) Appl. No.: 10/867,702

(22) Filed: Jun. 16, 2004

(65) Prior Publication Data

US 2005/0281547 A1 Dec. 22, 2005

(51) Int. Cl.
*F24H 19/02* (2006.01)

(52) U.S. Cl. .............. 392/432; 392/435; 219/528

(58) Field of Classification Search ........ 392/339–341, 392/343, 346, 432, 435–437, 441, 444, 447, 392/456; 219/213, 530, 540, 443.1, 460.1–462.1, 219/468.1; 126/400, 263.01, 263.03; 165/10
See application file for complete search history.

(56) References Cited

U.S. PATENT DOCUMENTS

| 442,933 | A | * | 12/1890 | Abshagen | 392/401 |
| 729,862 | A | * | 6/1903 | Hewitt et al. | 392/375 |
| 2,653,214 | A | * | 9/1953 | Shaw | 392/444 |
| 2,762,896 | A | * | 9/1956 | Pendleton | 219/539 |
| 3,356,828 | A | * | 12/1967 | Furness | 392/344 |
| 3,381,112 | A | * | 4/1968 | Togni | 392/456 |
| 3,532,856 | A | * | 10/1970 | Collins | 392/344 |
| 3,704,359 | A | * | 11/1972 | Laing | 219/213 |
| 3,719,796 | A | * | 3/1973 | Abildtrup | 219/449.1 |
| 3,720,198 | A | * | 3/1973 | Laing et al. | 126/400 |
| 3,825,059 | A | * | 7/1974 | Laing | 165/10 |
| 4,797,534 | A | * | 1/1989 | Prager et al. | 392/456 |
| 5,025,133 | A | * | 6/1991 | Tsutahara et al. | 219/444.1 |
| 5,293,583 | A | * | 3/1994 | Chudgar | 392/444 |
| 5,442,156 | A | * | 8/1995 | Westerman et al. | 219/243 |

FOREIGN PATENT DOCUMENTS

| DE | 2747112 | * | 4/1979 | |
| JP | 55-131691 | * | 10/1980 | |
| JP | 59-56636 | * | 4/1984 | 392/437 |
| JP | 63-56586 | * | 3/1988 | |
| JP | 1-203827 | * | 8/1989 | 219/213 |
| JP | 6-123434 | * | 5/1994 | 219/213 |
| JP | 7-208885 | * | 8/1995 | |
| JP | 2001-74259 | * | 3/2001 | |
| WO | 85/00214 | * | 1/1985 | |

* cited by examiner

*Primary Examiner*—Thor S. Campbell
(74) *Attorney, Agent, or Firm*—Ogilvy Renault LLP

(57) ABSTRACT

A surface heating system comprising a sealed enclosure formed by connected top, bottom and side walls, at least one of the walls being in heat exchange relationship with a surface to be heated, a heat source connected in heat exchange relationship with the enclosure, at least one heat absorbing body located within the enclosure, and a heat conducting fluid filling the enclosure and surrounding the at least one heat absorbing body, the heat conducting fluid transferring heat from the heat source to the top wall and to the at least one heat absorbing body, the at least one heat absorbing body using at least part of the heat received from the heat conducting fluid to store energy such as to be able to release the energy over an extended period of time in the form of heat transferred to the top wall through the heat conducting fluid.

18 Claims, 5 Drawing Sheets

HEATING TILES

BACKGROUND OF THE INVENTION

1. Field of the Invention

The present invention relates to surface heating systems such as heating tiles used on floor surfaces.

2. Background Art

Heating floors have been a type of surface heating system widely used in the industry for a long time. During the last decades, concerns over energy savings and improvements in thermal insulation have brought this type of heating system into houses as well, where it has become increasingly popular.

Electrical residential heating floors systems are widely used. One type of electrical system usually comprises a heating cable or wire which is embedded in a concrete slab. The concrete slab is floating on the standard subfloor and receives thereon the desired floor lining. A main disadvantage of this system is that the floor heats up relatively slowly due to the low heat conducting properties of concrete.

A second type of electrical system which is widely used usually comprises a heating film which is installed between the subfloor and the floor lining. Because of its low inertia, this system heats up more quickly than the alternative electrical system described above, but is generally unable to accumulate and retain a significant amount of energy in order to reduce electrical costs.

Hydronic residential heating floors systems are also widely used. One type of hydronic system comprises pipes in which heated water is circulating and which are either placed between the subfloor and floor lining or embedded in a concrete slab similar to the one described above. However, hydronic systems can be costly since they require and auxiliary heating system for the water as well as pumps to create the water flow. Moreover, like the similar electrical system, the hydronic system using a concrete slab heats up relatively slowly due to the low heat conducting properties of concrete.

Moreover, all of the systems which are installed under the floor lining can be difficult and costly to repair due to the necessity of removing the lining to access the system, which usually necessitates the installation a new floor lining after the repair.

SUMMARY OF INVENTION

It is therefore an aim of the present invention to provide a surface heating system able to store energy in the form of heat and release it over an extended period of time.

It is another aim of the present invention to provide an efficient surface heating system which allows a reduction in heating costs.

It is yet another aim of the present invention to provide a heating floor lining comprising autonomous tiles that are electrically interconnected.

Therefore, in accordance with the present invention, there is provided a surface heating system comprising a sealed enclosure formed by connected top, bottom and side walls, at least one of the walls being in heat exchange relationship with a surface to be heated, a heat source connected in heat exchange relationship with the enclosure, at least one heat absorbing body located within the enclosure, and a heat conducting fluid filling the enclosure and surrounding the at least one heat absorbing body, the heat conducting fluid transferring heat from the heat source to the at least one of the walls and to the at least one heat absorbing body, the at least one heat absorbing body using at least part of the heat received from the heat conducting fluid to store energy such as to be able to release the energy over an extended period of time in the form of heat transferred to the at least one of the walls through the heat conducting fluid.

Further in accordance with the present invention, there is provided a surface heating system comprising a sealed enclosure in heat exchange relationship with a surface to be heated, a heat source connected in heat exchange relationship with the enclosure, and a fluid filling the enclosure, the fluid transferring a first part of the heat from the heat source the surface to be heated and using a second part of the heat from the heat source to store energy such as to be able to release the energy over a given period of time in the form of heat transferred to the surface to be heated.

BRIEF DESCRIPTION OF THE DRAWINGS

Reference will now be made to the accompanying drawings, showing by way of illustration a preferred embodiment of the present invention and in which.

DESCRIPTION OF THE PREFERRED EMBODIMENTS

Figure 1:
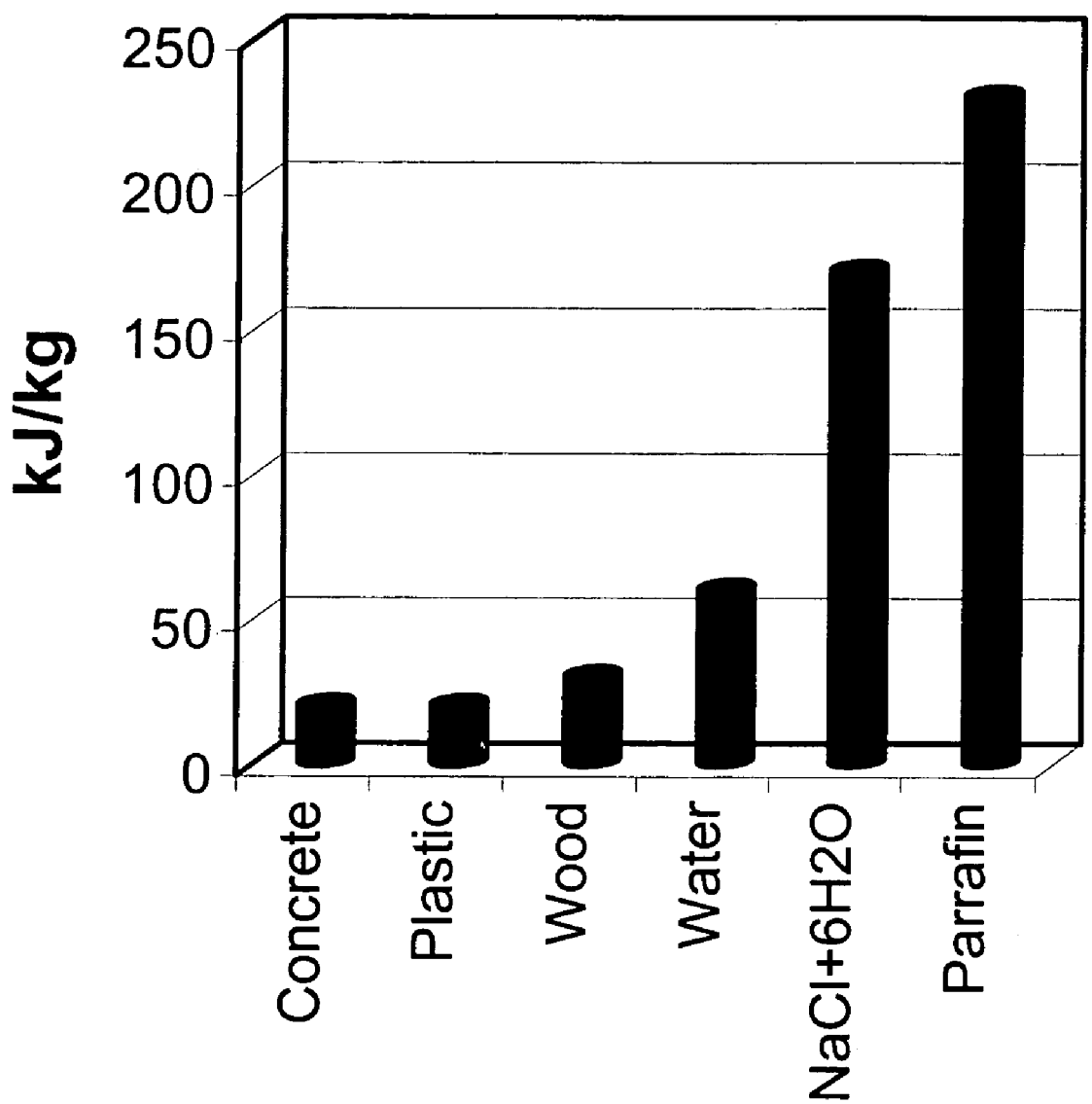
FIG. 1 is a graphical representation of the heat storage capacity of several materials.
Figure 2:
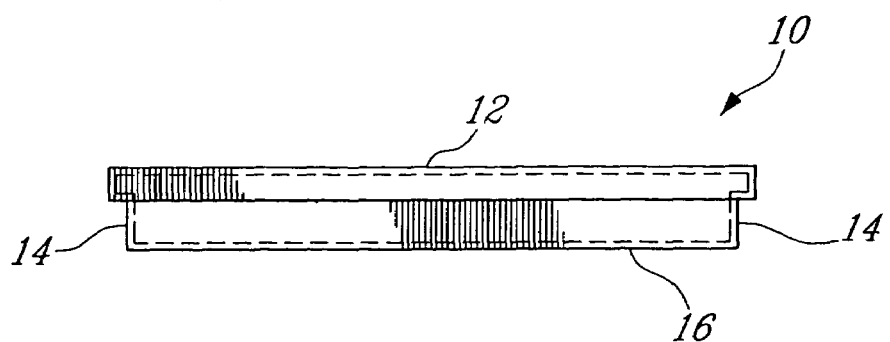
FIG. 2 is a top view of a tile according to a preferred embodiment of the present invention.
Figure 3:
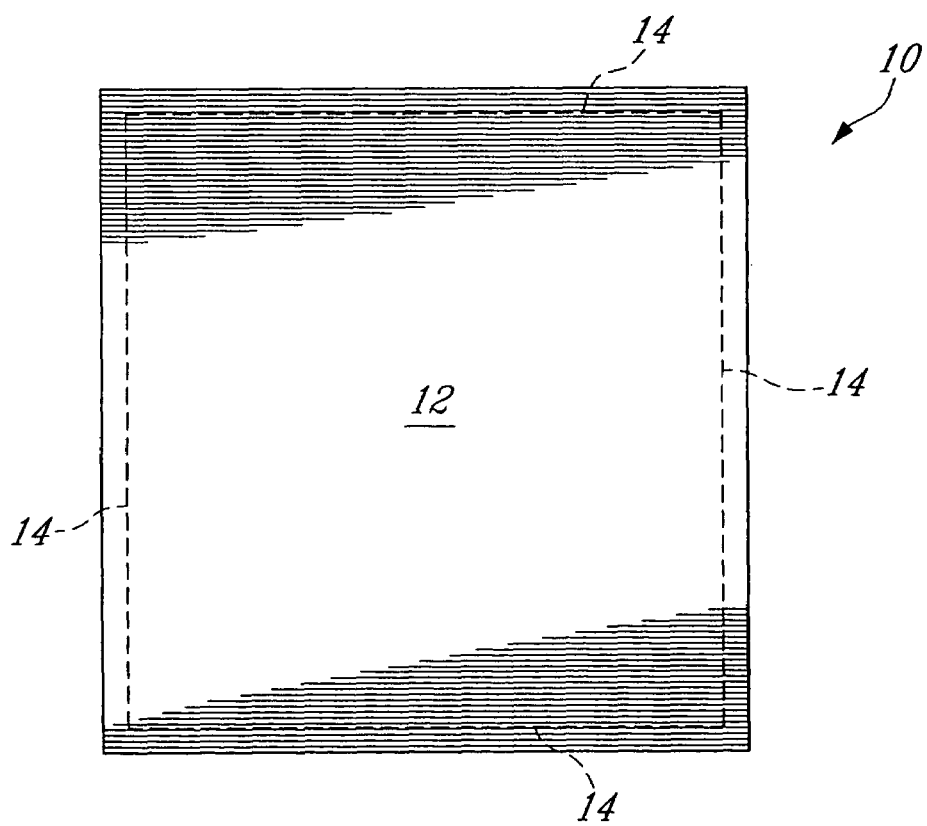
FIG. 3 is a side view of the tile of FIG. 2.
Figure 4:
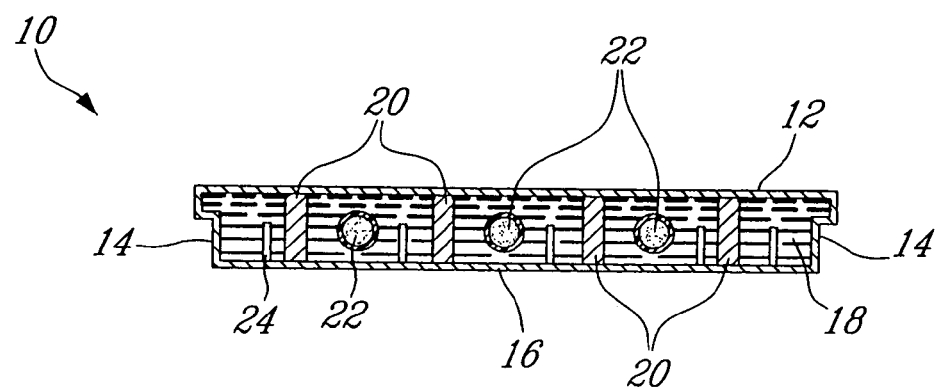
FIG. 4 is a top view, in cross-section, of the tile of FIG. 2.
Figure 5:
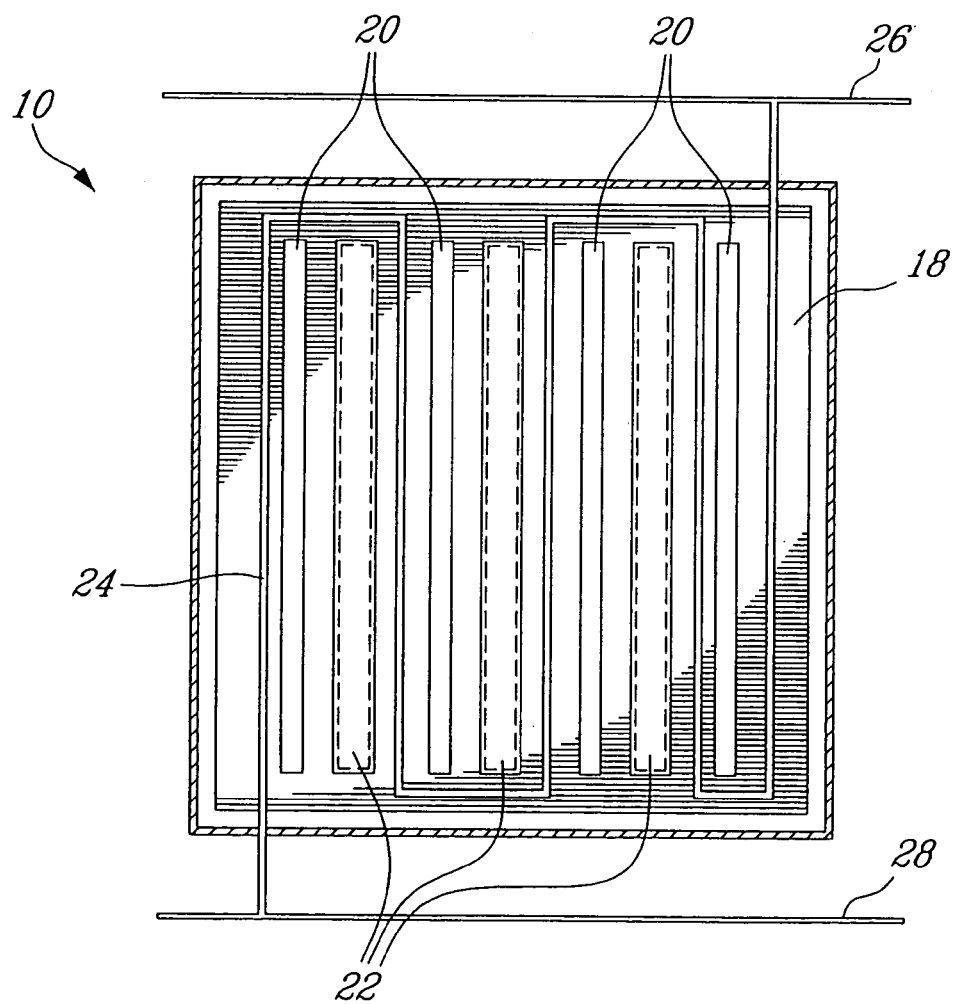
FIG. 5 is a side view, in cross-section, of the tile of FIG. 2.

Numerous studies have established that heat can be stored into a liquid or solid body with a capacity varying with the nature of the body. Examples of heat storage capacities are illustrated in FIG. 1: for example, water can store about 2.4 times more heat by weight unit than concrete, while paraffin, which is a phase change material (PCM) can store about 4 times more heat by weight unit than water. Phase change materials (PCM) are usually very efficient in storing heat.

Applicants have devised a way to use PCM's within a heating tile, preferably used in a heating floor assembly, in order to greatly improve heating performances. For user's comfort, the temperature of a heating floor should be around 28° C. Accordingly, not all PCM's are adapted to be used in a heating floor tile: for example some paraffins have a melt temperature of approximately 60° C., which is too high for a heating floor tile. A PCM used in a heating floor tile should preferably have a melt temperature between 27 and 30° C. for optimal performances. A preferred PCM is hydrated sodium chloride ($NaCl+6H_2O$), otherwise known as salt, which has a melt temperature within the preferred interval and which can absorb about 3 times more heat than water when melting (about 160 KJ/Kg) and release the equivalent heat when solidifying.

Referring to FIGS. 2–5, a tile 10 according to the present invention is shown. The tile 10 comprises a top wall 12, four side walls 14 and a bottom wall 16 made from an appropriate material, with preferred materials being concrete, composites, metal or ceramic. The tile walls 12,14,16 are connected to form a sealed enclosure. The enclosure is filled with a beat conducting fluid 18, which is preferably a fluid that can be heated relatively rapidly. A preferred heat conducting fluid 18 for tiles to be used in a heating floor assembly is distilled water.

The outer surface of the top wall 12 is adequate to provide a desired floor surface. A plurality of supports 20 are preferably provided between the top and bottom walls 12,16 to ensure the structural integrity of the tile 10. The supports 20 can be made from a variety of materials, including plastics, metals and composites. When the supports 20 are made of a heat conducting material, such as appropriate metals or composites, the supports 20 will also serve as a link improving heat exchange between the heat conducting fluid and the top wall 12.

At least one heal absorbing body extends in the tile 10. Preferably, the tile 10 contains several heat absorbing bodies in the form of cylindrical plastic containers 22 containing a heat absorbing material. It is also considered to provide containers 22 having another appropriate shape, or being made from a different appropriate material such as glass, composite or metal. The heat absorbing material is preferably a PCM, and most preferably hydrated sodium chloride as discussed above. It is also considered to fill the containers 22 with other materials which possess adequate heat storing capacity.

An electric healing wire 24 is disposed within the tile 10 in a multiple S-shaped pattern, preferably passing at least once between adjacent containers 22, and acting as a heat source. The heating wire 24 extends outside of the tile 10 and is connected to power supply cables 26,28 providing low intensity alternating electrical power (less than 30V AC). Adjacent tiles are preferably connected in parallel to the power supply cables 26,28.

The heating system of the present invention is controlled by a thermostat (not shown) adapted to manage the power supply to the heating tiles according to a desired temperature profile and other relevant parameters.

Figure 6:
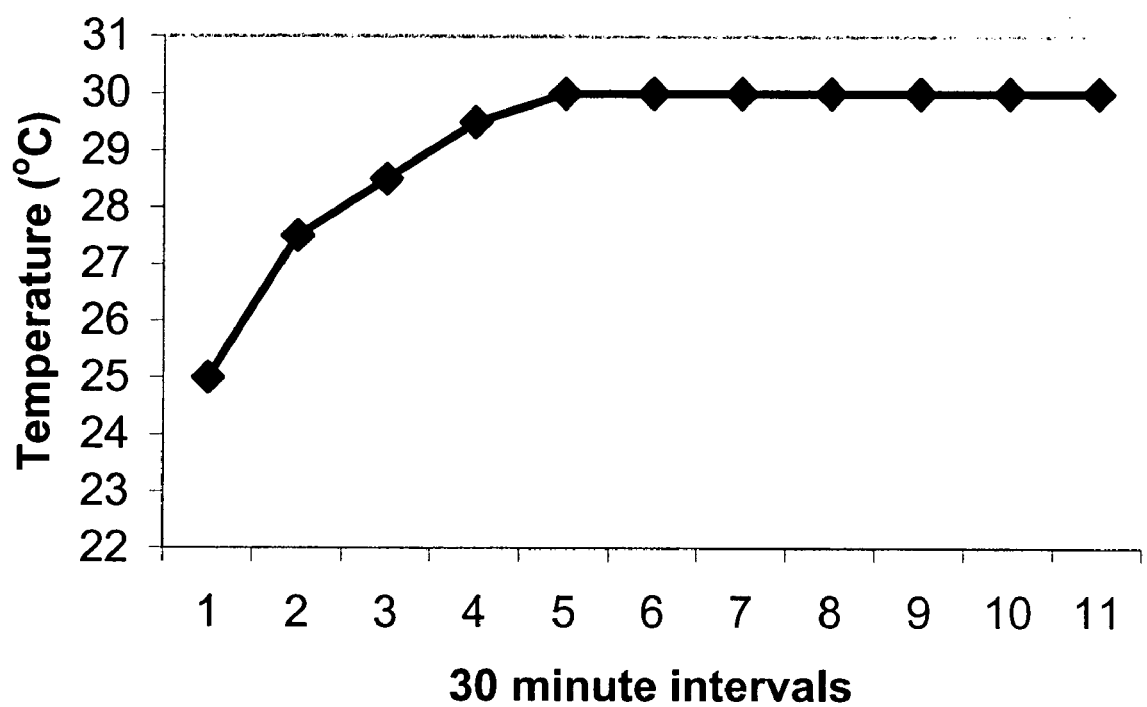
FIG. 6 is a graphical representation of the time required to heat a tile according to a preferred embodiment of the present invention from a temperature of 25° C. to a temperature of 30° C.
Figure 7:
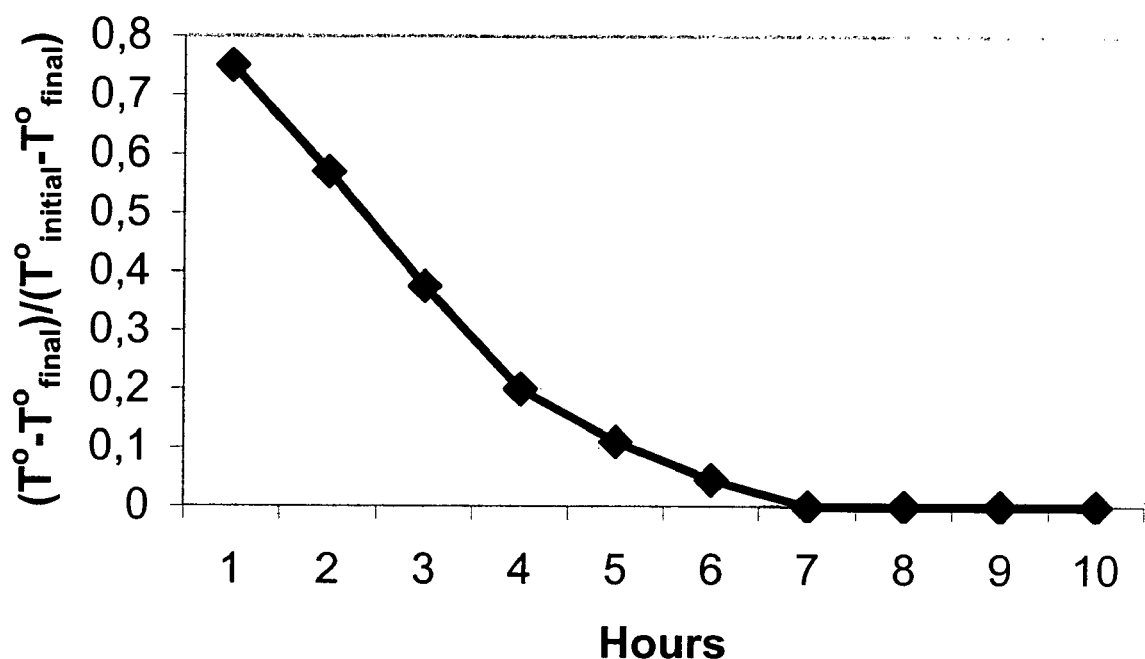
FIG. 7 is a graphical representation of the cooling of a heated tile according to a preferred embodiment of the present invention illustrating the release of cumulated energy.

In operation, the heating wire 24 receiving electric power heats the heat conducting fluid contained within the tile 10. The heat conducting fluid transfers this heat to the material within the containers 22 as well as to the walls of the tile 10, either directly or through the supports 20. The top wall 12 of the tile, or floor surface, is thus rapidly heated by the heat conducting fluid, as shown in FIG. 6, while the material within the containers 22 stores energy, preferably by going through a phase change (e.g. melting). When the heating wire 24 no longer receives electric power and thus stops heating the heat conducting fluid, the material within the containers 22 will slowly release the stored energy in the form of heat, as shown in FIG. 7, preferably by going trough the reverse phase change (e.g. solidifying). This heat will be transferred by the heat conducting fluid to the top wall 12 of the tile 10, or floor surface In an alternate embodiment, the heat conducting fluid 18 and heat absorbing material are the same. In that case, the containers 22 are omitted such that the fluid completely fins the enclosure 18, conducting heat between the heating wire 24 and the top wall 12 as well as storing energy for later release. The fluid can be similar to the heat conducting fluid of the previous embodiment, such as distilled water, similar to the heat absorbing material of the previous embodiment, such as a PCM, or any other adequate fluid. However, materials having a high heat storage capacity usually tend to heat up more slowly while materials heating up more quickly usually tend to have a lower heat storage capacity. Hence, this embodiment win probably not be as efficient as the preferred embodiment with both a heat conducting fluid and containers containing a heat absorbing material, which combines rapid heating and a high heat storage eapacity.

The system of the present invention allows for rapid heating of ambient air in a room through the floor surface, while being able to store and release a significant amount of energy such as to function with limited electrical power, thus at reduced cost.

Because of the heat storing capacity of the system of the present invention, it can heat a room for a prolong period of time when electrical power is not available, for example during a power outage.

In some cases, the system of the present invention can also allow home owners to qualify for special discounts offered by some electrical suppliers for high efficiency heating systems, which can heat quickly while being able to release stored energy over a given period of time.

Since the tiles 10 are individually supplied with electricity in a parallel circuit, one can be easily installed or replaced without affecting the function of adjacent tiles. The autonomy of the tiles 10 also allows them to be easily installed both in new and existing homes.

The invention can also be applied in heating systems other than heating floors, one example of which being heating walls, such as in exterior wall surfaces upon which the formation of ice must be prevented. In the case where the tile of the invention is used at sub-zero temperatures, the heat conducting fluid must of course be selected accordingly, so as not to freeze in the range of temperatures the tile is subjected to. Examples of appropriate heat conducting fluids are fluids that are methanol-based or ethylene glycol-based. The heat absorbing material must also be selected according to a desired surface temperature to be maintained, e.g. a PCM having a melt temperature around the desired temperature or another material having a heat storage capacity which is maximal at that temperature. It is also considered to incorporate the present invention in surfaces other than tiles.

The embodiments of the invention described above are intended to be exemplary. Those skilled in the art will therefore appreciate that the foregoing description is illustrative only, and that various alternatives and modifications can be devised without departing from the spirit of the present invention. Accordingly, the present invention is intended to embrace all such alternatives, modifications and variances which fall within the scope of the appended claims.

The invention claimed is:

1. A surface heating system comprising: a plurality of heating tiles laid down side by side in a coplanar relationship and defining a generally flat surface, each heating tile having top, bottom and side walls, the top, bottom ad side walls defining the boundaries of a sealed cavity, the sealed cavity containing a heat conducting fluid, the heat conducting fluid being prevented from flowing outside of said boundaries, the tiles being electrically interconnected by at least one low voltage heating wire running through the tiles and immersed directly in the heat conducting fluid, the heat conducting fluid transferring heat from the at least one low voltage heating wire to at least the top wall of the tiles and storing heat such as to be able to release the stored heat over an extended period of time.

2. The surface heating system defined in claim 1, wherein each heating tile further comprises at least one heat absorbing body sealed in a container mounted in the sealed cavity of the tile, the heat absorbing body having a different composition than that of said heat absorbing body.

3. The surface heating system according to claim 1, wherein the at least one heating wire can maintain the heat conducting fluid between 27° C. and 30° C. such as to maintain a temperature of the surface to be heated within a range suitable for a heating floor surface.

4. The surface heating system according to claim 1, wherein the at least one heating wire has first and second ends extending out of each of the tiles through opposite ones of the walls thereof and connected to a power supply through a parallel circuit.

5. The surface heating system according to claim 4, wherein the power supply supplies low intensity electrical power.

6. The surface heating system according to claim 1, wherein the top, bottom and side walls are flat and made of a rigid material.

7. The surface heating system according to claim 6, wherein the rigid material is selected from the group consisting of concrete, composites, metals and ceramics.

8. The surface heating system according to claim 1, wherein the system further comprises supports extending between the at least one of the walls and an opposed one of the walls to individually reinforce each of the heating tiles.

9. The surface heating system according to claim 8, wherein the supports are made of plastic.

10. The surface heating system according to claim 8, wherein the supports are made of one of metal and composite such as to maximize heat transfer between the heat conducting fluid and the walls of the tiles.

11. The surface heating system according to claim 1, wherein the heat conducting fluid is selected from the group consisting of distilled water, methanol-based fluids and ethylene glycol-based fluids.

12. The surface, heating system according to claim 2, wherein the container has a cylindrical shape.

13. The surface heating system according to claim 2, wherein the container is made from a material selected from the group consisting of plastics, glass, composites and metals.

14. The surface heating system according to claim 2, wherein the heat absorbing material is a phase changing material.

15. The surface heating system according to claim 14, wherein the phase changing material is hydrated sodium chloride.

16. The surface heating system according to claim 14, wherein the phase changing material is selected to have a phase changing temperature in the vicinity of a desired temperature of the surface to be heated.

17. A surface heating system comprising:

a hollow floor tile adapted to be laid down adjacent to similar floor tiles, the floor tile having walls defining the boundaries of a sealed cavity filled with a heat conducting liquid, said walls including a flat top wall adapted to form part of a floor surface; and a heat source connected in heat exchange relationship with the floor tile;

the heat conducting liquid being confined within the boundaries of said sealed cavity and restrained against flowing outside of said boundaries, the liquid transferring a first part of the heat from the heat source to the surface to be heated and using a second part of the heat from the heat source to store energy such as to be able to release the energy over a given period of time in the form of heat transferred to the surface to be heated.

18. The surface heating system according to claim 17, wherein the system further comprises supports extending between opposed walls of the floor tile.

* * * * *